United States Patent
Takenouchi

(10) Patent No.: US 11,240,384 B2
(45) Date of Patent: Feb. 1, 2022

(54) INFORMATION PROCESSING APPARATUS, METHOD FOR INFORMATION PROCESSING, AND STORAGE MEDIUM

(71) Applicant: CANON KABUSHIKI KAISHA, Tokyo (JP)

(72) Inventor: Takuya Takenouchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/937,276

(22) Filed: Jul. 23, 2020

(65) Prior Publication Data
US 2021/0044704 A1 Feb. 11, 2021

(30) Foreign Application Priority Data
Aug. 8, 2019 (JP) .............................. JP2019-146641

(51) Int. Cl.
*H04N 1/00* (2006.01)
*G06F 3/14* (2006.01)

(52) U.S. Cl.
CPC ..... *H04N 1/00196* (2013.01); *H04N 1/00161* (2013.01); *H04N 1/00456* (2013.01)

(58) Field of Classification Search
None
See application file for complete search history.

(56) References Cited

U.S. PATENT DOCUMENTS

| | | | | |
|---|---|---|---|---|
| 2007/0146833 A1* | 6/2007 | Satomi | ................. | G11B 27/034 358/537 |
| 2012/0256947 A1* | 10/2012 | Akira | ..................... | G06F 16/93 345/619 |
| 2012/0284594 A1* | 11/2012 | Norwood | .............. | G06F 3/0481 715/202 |
| 2018/0167522 A1* | 6/2018 | Kunieda | .............. | G06K 9/6232 |

FOREIGN PATENT DOCUMENTS

JP  2018-124776 A  8/2018

* cited by examiner

*Primary Examiner* — Beniyam Menberu
(74) *Attorney, Agent, or Firm* — Canon U.S.A., Inc. I.P. Division

(57) ABSTRACT

An information processing apparatus includes an arrangement unit and a display unit. The arrangement unit arranges an image in a page. The display unit displays, on a display, a page image indicating the arrangement of the image in the page by the arrangement unit. Based on that an image selected by a user is arranged in a plurality of pages, the display unit displays a plurality of page images, each indicating arrangement of the selected image in each of the plurality of pages.

13 Claims, 7 Drawing Sheets

FIG.2

| IMAGE ID | FILE PATH |
|---|---|
| 001 | 001.jpg |
| 002 | 002.jpg |
| 003 | 003.jpg |
| 004 | 004.jpg |
| 005 | 005.jpg |
| 006 | 006.jpg |
| 007 | 007.jpg |
| 008 | 008.jpg |
| 009 | 009.jpg |
| 010 | 010.jpg |
| 011 | 011.jpg |
| 012 | 012.jpg |
| 013 | 013.jpg |
| 014 | 014.jpg |
| 015 | 015.jpg |
| 016 | 016.jpg |
| 017 | 017.jpg |

FIG.3

| PAGE NUMBER | IMAGE ID | x | y | width | height |
|---|---|---|---|---|---|
| 1 | 001 | 7 | 30 | 135 | 90 |
| | 002 | 160 | 30 | 135 | 90 |
| 2 | 003 | 60 | 15 | 180 | 120 |
| 3 | 004 | 30 | 10 | 90 | 60 |
| | 005 | 30 | 80 | 90 | 60 |
| | 006 | 170 | 30 | 60 | 90 |
| 4 | 007 | 7 | 30 | 135 | 90 |
| | 008 | 160 | 30 | 135 | 90 |
| 5 | 001 | 7 | 30 | 135 | 90 |
| | 009 | 160 | 30 | 135 | 90 |
| 6 | 010 | 30 | 80 | 90 | 60 |
| | 011 | 45 | 30 | 60 | 90 |
| 7 | 012 | 60 | 15 | 180 | 120 |
| 8 | 001 | 60 | 15 | 180 | 120 |
| 9 | 013 | 60 | 15 | 180 | 120 |
| 10 | 014 | 60 | 15 | 180 | 120 |

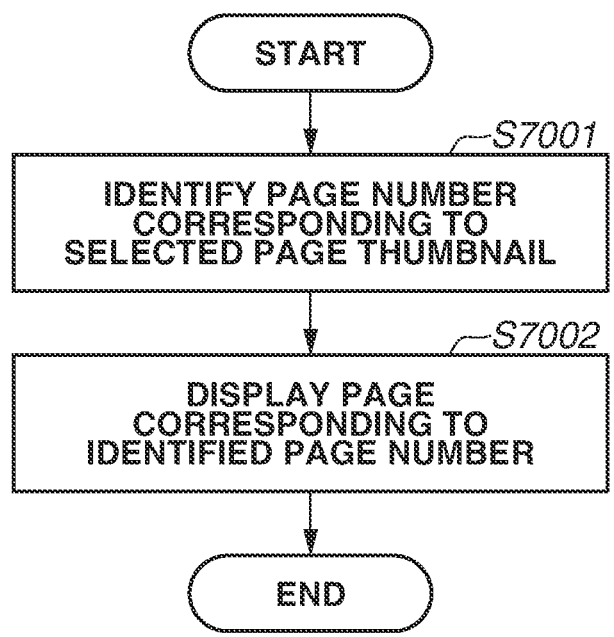

under the present disclosure is not limited only to the following exemplary embodiment. Not all of the configurations described in the present exemplary embodiment are essential to solve the issues of the present disclosure. The present exemplary embodiment will be described using a personal computer (PC) as an example of an information processing apparatus. However, the information processing apparatus is not limited to the PC, and another apparatus such as a smartphone may be used.

INFORMATION PROCESSING APPARATUS, METHOD FOR INFORMATION PROCESSING, AND STORAGE MEDIUM

BACKGROUND

Field

The present disclosure relates to an information processing apparatus that displays a page image indicating arrangement of an image in a page on a display.

Description of the Related Art

In some technologies of recent years, a user arranges a plurality of images in a template for a photo album and creates the photo album including the images using an application. Japanese Patent Application Laid-Open No. 2018-124776 discusses a technology in which a user replaces one image with another image to be arranged in an album.

In a case where the user edits an image to be arranged in a page, the user can appropriately arrange a desired image in a desired page by recognizing information about an image already arranged in the page.

SUMMARY

The present disclosure is directed to a technology that enables a user to more easily recognize information about an image arranged in a page.

According to an aspect of the present disclosure, an information processing apparatus includes an arrangement unit configured to arrange an image in a page, and a display unit configured to display, on a display, a page image indicating the arrangement of the image in the page by the arrangement unit, wherein, based on that an image selected by a user is arranged in a plurality of pages, the display unit displays a plurality of page images, each indicating arrangement of the selected image in each of the plurality of pages.

Further features of the present disclosure will become apparent from the following description of exemplary embodiments with reference to the attached drawings.

BRIEF DESCRIPTION OF THE DRAWINGS

FIG. 2 is a diagram illustrating a list of images available for an album.

FIG. 3 is a diagram illustrating a list of images arranged in pages.

FIG. 7 is a flowchart illustrating processing of displaying a page corresponding to a page thumbnail.

DESCRIPTION OF THE EMBODIMENTS

An exemplary embodiment of the present disclosure will be described in detail below with reference to the attached drawings. The following exemplary embodiment is not intended to limit the present disclosure according to the scope of claims, and not all of combinations of features described in the exemplary embodiment are necessarily required for a solution in the present disclosure.

In the present exemplary embodiment, a technology of editing such as replacement of an image with another image to be arranged in an album will be described. In such editing, a user can appropriately arrange a desired image in a desired page by recognizing information about an image arranged in the album. Examples of such information include a page in which an image selected by the user is arranged and a position at which the image is arranged in the page.

In the present exemplary embodiment, when an image already used in the album (already arranged in a page) is selected by the user, a list of thumbnails of pages using this image is displayed. Further, in each of the thumbnails, a portion where the image selected by the user is arranged is highlighted. As a result, the user can easily recognize the position at which the image is arranged in the page and the size of this image relative to the entire page or other images. Therefore, the user can easily check, for example, whether the same image is used in a plurality of pages, or which page each of the plurality of pages is. Furthermore, the user can easily check at which position and in what size the image is arranged in each of the pages.

Figure 1:
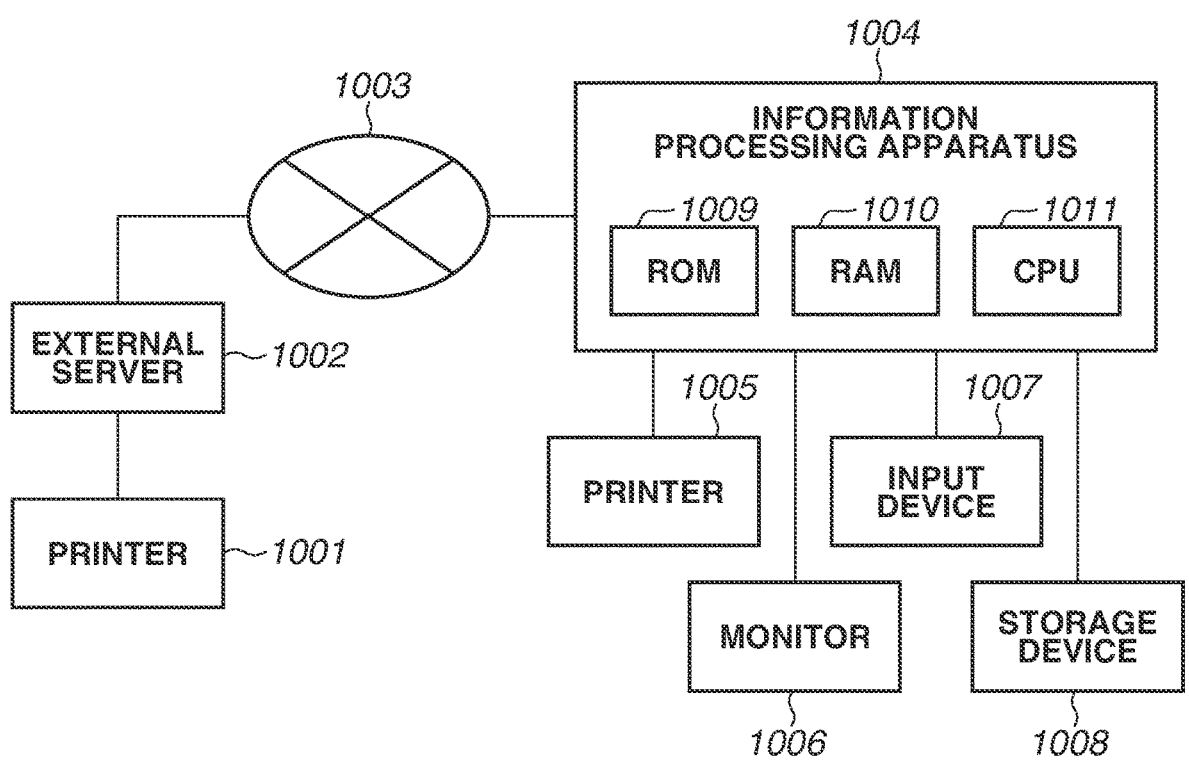
FIG. 1 is a diagram illustrating an example of a system configuration.

A configuration of an information processing apparatus 1004 in the present exemplary embodiment will be described with reference to FIG. 1. The information processing apparatus 1004 to be used in the present exemplary embodiment is an apparatus such as a personal computer (PC) or a smartphone, and can create an album (a photo album or a photobook) from input image data. Further, the information processing apparatus 1004 can output the created album to a printer 1005 as print data to make the printer 1005 print the print data, or can upload the created album to an external server 1002 as print data. The external server 1002 makes a printer 1001 print the uploaded print data.

A central processing unit (CPU) 1011 controls the information processing apparatus 1004 by executing various programs stored in a storage device 1008, a read-only memory (ROM) 1009, and a random-access memory (RAM) 1010. The CPU 1011 implements each function of the information processing apparatus 1004 by executing a program stored in the ROM 1009 or the RAM 1010. The CPU 1011 also performs calculations and processing of information, and controls each piece of hardware included in the information processing apparatus 1004. The RAM 1010 serves as a work memory of the CPU 1011. If the RAM 1010 is a nonvolatile RAM, the RAM 1010 stores each program.

A program corresponding to an album creation application to be described below and an operating system (OS) are stored in the ROM 1009 or the storage device 1008 to be described below. The CPU 1011 executes processing illustrated in FIG. 5 to be described below by executing the program of the album creation application on the OS.

A network 1003 is, for example, the Internet, and is connected to the information processing apparatus 1004 and the external server 1002. The network 1003 is a communication network for transmitting information between the connected apparatuses. The external server 1002 includes an input-output interface (not illustrated) for connection to the printer 1001, and is connected to the printer 1001. The external server 1002 can be a single server apparatus. Alternatively, a server system including a plurality of server apparatuses cooperating with each other can operate as the external server 1002.

An album created in the information processing apparatus 1004 is uploaded to the external server 1002 via the network 1003. The external server 1002 makes the printer 1001 print the uploaded album. The external server 1002 is an album order receiving and management server, and performs order management and settlement processing. For example, in a case where album creation is a fee-based service, the external server 1002 receives an order for album creation and performs settlement based on information including customer information (such as a full name and an address) and settlement information received from the information processing apparatus 1004. The user uploads an album created using the information processing apparatus 1004 to the external server 1002, and the external server 1002 makes the printer 1001 print the album once a necessary album purchase procedure is performed. Afterward, an output print product is bound, and the bound print product is sent to the user.

Album data to be uploaded to the external server 1002 is image data in which an image is already arranged in a template. Alternatively, an image to be arranged in an album, a template, and layout information (to be described with reference to FIG. 3) including the position and the size of an image to be arranged in the template can be uploaded as the album data. In this case, the external server 1002 arranges an image in a template according to the layout information, and makes the printer 1001 print image data representing the arranged image. Alternatively, the above-described image, the template, and the layout information can be transmitted from the external server 1002 to the printer 1001, and the printer 1001 can perform image arrangement and printing.

The information processing apparatus 1004 includes the printer 1005, a monitor 1006, an input device 1007, the storage device 1008, and an input-output interface (not illustrated) for connection to the network 1003.

The printer 1005 is a printer for printing print data corresponding to an album created in the information processing apparatus 1004. The user determines an image to be arranged in the album, an arrangement positions and an arrangement size using the information processing apparatus 1004, and prints the album, in which the image is arranged, using the printer 1005 of the user. The user can bind the album by him/herself.

The monitor 1006 is a display device (a display) for displaying various kinds of information created by the information processing apparatus 1004. The input device 1007 is a device for the user to input an instruction into the information processing apparatus 1004, and includes a keyboard and a pointing device. The input device 1007 and the monitor 1006 can be integrated into a touch panel, and in this case, the user can provide various instructions for the information processing apparatus 1004 by touching the touch panel.

The storage device 1008 is a device such as a hard disk drive (HDD) or a solid-state drive (SSD) for storing image data and templates. In FIG. 1, the monitor 1006, the input device 1007, and the storage device 1008 are each illustrated as a device disposed outside the information processing apparatus 1004. However, these are not limited to such a configuration, and the information processing apparatus 1004 can include some or all of the monitor 1006, the input device 1007, and the storage device 1008 (can be a RAM shared with the information processing apparatus 1004) as components.

As described above, the ROM 1009 or the storage device 1008 stores the album creation application. The CPU 1011 can create an album, in which an image is arranged in a template on the monitor 1006, by executing the album creation application. Further, the CPU 1011 can upload album data to the external server 1002 and perform order processing by executing the album creation application.

In a case where the CPU 1011 creates an album by executing the album creation application, at first, the CPU 1011 prompts the user to determine the number of pages of the album to be created. When the number of pages is determined by the user, the CPU 1011 selects an image to be used for the album by the album creation application.

In this selection of the image, for example, the CPU 1011 prompts the user to select the image to be used for the album, and the user selects the image. For example, the CPU 1011 displays a list of a plurality of images stored in the storage device 1008 on the monitor 1006 using the album creation application or a function of the OS. The user then selects a desired image. Alternatively, the CPU 1011 can automatically select an image such as a high-quality image or an image including a specific person designated by the user by executing the album creation application. The above-described method of a selection of an image by the user will be hereinafter referred to as a "manual image selection", and the above-described method of an automatic selection of an image by the CPU 1011 will be hereinafter referred to as an "automatic image selection".

When the image is selected in the manner described above, the CPU 1011 lays out the image in templates each corresponding to a spread page of the album by the album creation application. The spread page is a layout area corresponding to two pages on the right and left when the album is opened, and an image to be presented to the user when the user opens the album to the page is arranged in this layout area.

In laying out the image, the CPU 1011 can automatically lay out the image of a predetermined size at a predetermined position in the template, or can lay out the image of a size at a position determined by an instruction of the user. The former layout method will be hereinafter referred to as an "automatic layout", and the latter layout method will be hereinafter referred to as a "manual layout". The user can select the automatic layout or the manual layout as the layout method.

In the case of the automatic layout, a plurality of images is laid out in a plurality of spread pages of an album. The sequence in which the plurality of images is laid out in this process is determined using any of various methods. For example, in a case where information representing an image-capturing date and time is included in an image file including an image, a plurality of images is sorted by image-capturing date and time. Then, images having earlier image-capturing dates and times are sequentially laid out from the top page of the album, so that layout based on the image-capturing date and time is implemented. Alternatively, the images can be sorted based on a sequence selected by the user. Such automatic layout enables the user to create album data in which images are laid out by simple operations.

Upon performing the above-described automatic layout or manual layout, the CPU 1011 displays a layout result on the monitor 1006. This display will be described below with reference to FIG. 4.

Further, the CPU 1011 manages a list of images available for album creation Both of the images selected and the images not selected by the above-described automatic image selection or manual image selection are included in the list of images available for album creation.

Figure 4:
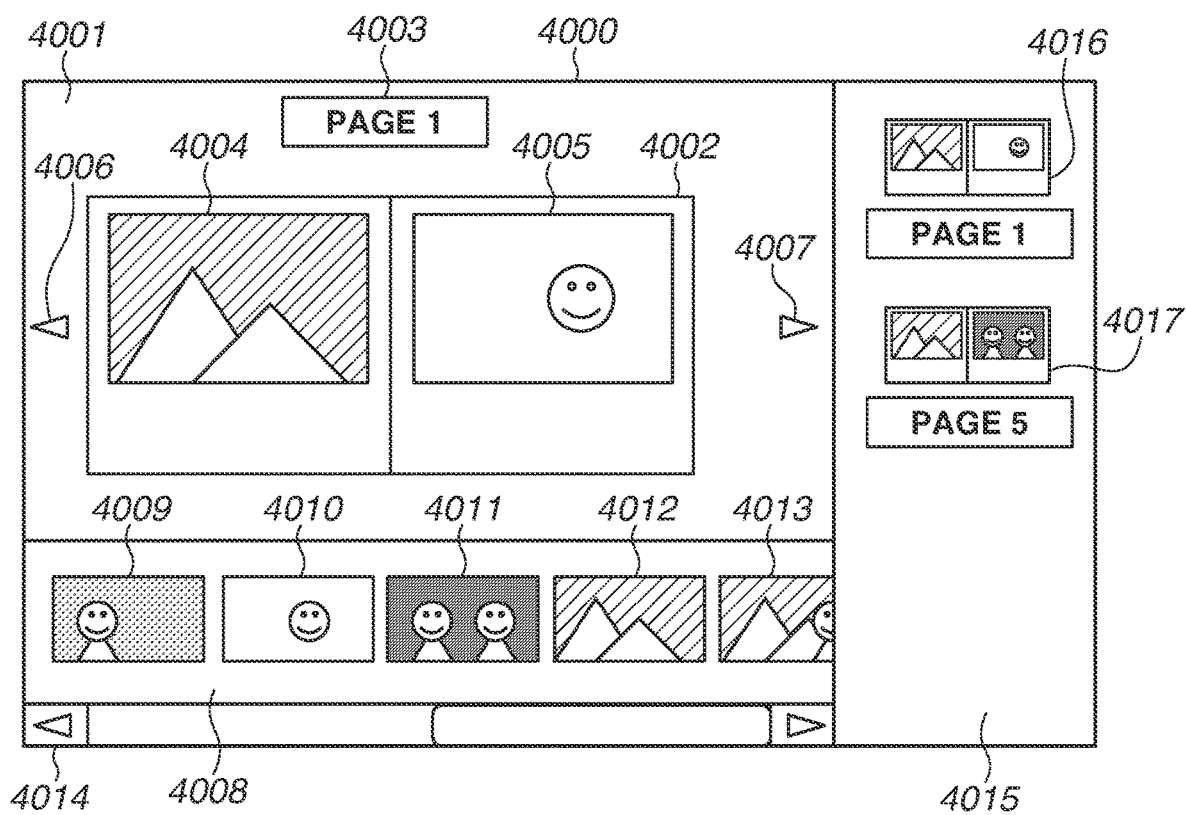
FIG. 4 illustrates an example of a screen to be displayed for editing an album.

FIG. 2 is a diagram illustrating a list of images available for an album. The list illustrated in FIG. 2 is created before or after the execution of the automatic image selection or the manual image selection, and is created by the CPU 1011 before a screen to be described below with reference to FIG. 4 is displayed.

In FIG. 2, "IMAGE ID" represents an image identification (ID) for identifying an image available for the album, and "FILE PATH" represents a file path for accessing an image file including an image corresponding to "IMAGE ID". In the example illustrated in FIG. 2, the image files having the respective image IDs "001" to "017" are present as a plurality of images available for the album. In the example in FIG. 2, the image file is an ordinary image such as a picture taken by the information processing apparatus 1004 or an apparatus such as a digital still camera, and a file format thereof is Joint Photographic Experts Group (JPEG). A folder storing the image file can be included as the file path. Here, the example in which the image ID is included as a file name of the image file is described for a purpose of the description, but the file name can be arbitrary. When creating the list illustrated in FIG. 2, the CPU 1011 assigns an image ID to each of a plurality of image files each having an arbitrary file name.

Further, the CPU 1011 manages images used (laid out in pages) in an album among the images available for the album, pages where the used images are laid out, and a layout position as well as a layout size of each of the images.

FIG. 3 is a diagram illustrating a list of images arranged in pages in an album. FIG. 3 illustrates an example in which an album having 10 pages. In FIG. 3, "PAGE NUMBER" represents a page number of a spread page in the album. In other words, a page number 1 indicates the first page of the album. In the present exemplary embodiment, the spread page is one page as a page unit of an album, but is not limited to such a configuration. The CPU 1011 can manage each of the right and left pages of the spread page as one page.

In FIG. 3, "IMAGE ID" represents an ID for identifying an image, and is identical to the image ID illustrated in FIG. 2. In other words, the list in FIG. 3 includes the image IDs of images used in the album, among the image IDs included in the list illustrated in FIG. 2. In FIG. 3, the image ID is associated with the page number, so that which image is arranged in which spread page is managed.

In FIG. 3, "x" and "y" indicate a position at which each image is arranged in a page. Specifically, the upper left end of a spread page is defined as an origin position (0,0) of a coordinate system, and "x" and "y" in FIG. 3 indicate an x coordinate and a y coordinate, respectively, of the upper left point of the image. In FIG. 3, "width" and "height" indicate a width and a height, respectively, of the image in the above-described coordinate system. Such information about the image is not limited to the example illustrated in FIG. 3. For example, a rotational angle of each of the images is included in the list illustrated in FIG. 3, if the images can be laid out at the respective arbitrary angles. Further, the shape of the image is not limited to a rectangle and can be any shape. For example, the coordinates of a center point when an image is rotated can be included in the list illustrated in FIG. 3, as the x coordinate and the y coordinate of the image.

In a case where the layout method is the above-described automatic layout, the list illustrated in FIG. 3 is created when the automatic layout is executed. In a case where the layout method is the manual layout, the list illustrated in FIG. 3 is not created at the time when the layout begins. When the user subsequently lays out any image on any page, the CPU 1011 creates the list illustrated in FIG. 3.

In both the automatic layout and the manual layout, when predetermined editing for an image is performed by the user, the CPU 1011 updates the list illustrated in FIG. 3 as needed.

The predetermined editing includes replacement (change), addition, and deletion for images to be used in an album, as well as change of the layout position and the layout size of any of the images.

A screen for editing an album will be described with reference to FIG. 4. FIG. 4 is a diagram illustrating a screen to be displayed for editing an album, and an editing screen 4000 illustrated in FIG. 4 is displayed on the monitor (display) 1006. In a case where the layout method is the automatic layout, the editing screen 4000 illustrated in FIG. 4 is displayed after the layout is automatically executed in the manner described above. On the other hand, in a case where the layout method is the manual layout, the editing screen 4000 is displayed after images are selected. However, in the case of the manual layout, each page can be displayed, but no images are laid out at an initial stage.

An album display portion 4001 in FIG. 4 displays an album being edited. A spread page 4002 in FIG. 4 is included in the album being edited, and displayed within the album display portion 4001. A page number 4003 in FIG. 4 indicates a page number of a spread page displayed as the spread page 4002. The editing screen 4000 is displayed so that an image arranged in the spread page 4002 can be edited by a user operation performed for the spread page 4002. This editing includes processing such as deleting an image from the spread page 4002, changing to another image, changing the size and the position of an image to be arranged, and changing tint.

Images 4004 and 4005 in FIG. 4 are arranged in the spread page 4002. A previous button 4006 in FIG. 4 is provided to display a previous spread page as the spread page 4002. A next button 4007 in FIG. 4 is provided to display a next spread page as the spread page 4002.

An image list display portion 4008 in FIG. 4 is provided to display a list of images available for editing of the album. Images 4009 to 4013 that can be arranged in the album are displayed in the image list display portion 4008. The images saved and managed in the list illustrated in FIG. 2 are displayed in the image list display portion 4008 in FIG. 4. In other words, images (the images having the respective image IDs "015" to "017" in the example in FIG. 2 and FIG. 3) that are not currently laid out in the album are also included in the image list display portion 4008. A scroll bar 4014 in FIG. 4 is provided to scroll the image list display portion 4008.

A page thumbnail display portion 4015 in FIG. 4 is provided to display a thumbnail image (hereinafter referred to as a "page image" or a "page thumbnail") of a spread page. The CPU 1011 creates the page thumbnail (page image) for a spread page in which an image selected by the user (hereinafter referred to as a "selected image") in the image list display portion 4008 is arranged, by performing processing to be described below. The CPU 1011 displays the created page thumbnail (page image) in the page thumbnail display portion 4015. Page thumbnails 4016 and 4017 are each an example of such a page thumbnail. In the examples in FIG. 3 and FIG. 4, when an image 4012 corresponding to the image ID "001" is selected by the user, a page number (each of pages 1 and 5 in FIGS. 3 and 4) where the image 4012 is arranged as well as the page thumbnails 4016 and 4017 are displayed. Further, as illustrated in FIG. 4, the CPU 1011 highlights a portion corresponding to the selected image in the page thumbnail by, for example, overlaying a red frame on the portion. In other words, in the page thumbnail display portion 4015, the selected image is displayed to show its arrangement at which position in which spread page and what size within the album. For example, in a case where a plurality of images is arranged in the spread page, a selected image among the plurality of images is highlighted in such a way as to distinguish the selected image from other images.

Figure 5:
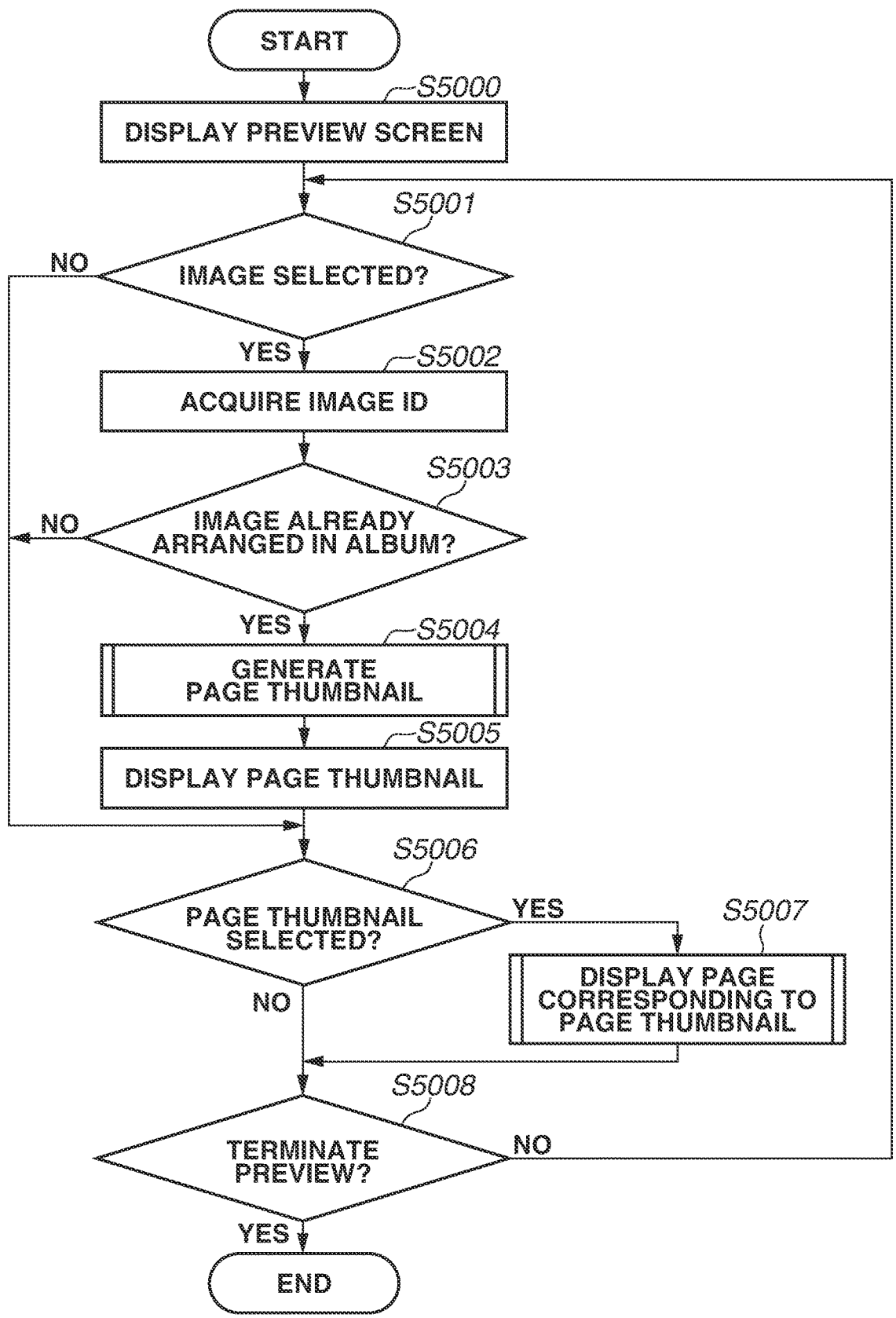
FIG. 5 is a flowchart illustrating processing according to an exemplary embodiment.

A method of displaying the editing screen 4000 illustrated in FIG. 4 will be described with reference to FIG. 5. FIG. 5 is a flowchart illustrating processing in the present exemplary embodiment. The processing of the flowchart illustrated in FIG. 5 is executed when the above-described automatic layout is completed or when the manual operation layout begins.

In step S5000, the CPU 1011 displays the editing screen 4000 illustrated in FIG. 4 as a print preview screen for an album. However, in a case of the manual layout, images have not yet been arranged.

After step S5000, a user can perform editing for an image arranged in the spread page 4002 (replacement of the image, and change of the position or size of the image) as appropriate, during the execution of the processing illustrated in FIG. 5. The information in the list illustrated in FIG. 3 is also updated as needed during the execution of the processing illustrated in FIG. 5. Other types of editing (such as color conversion) for the image can also be performed during the execution of the processing illustrated in FIG. 5.

In step S5001, the CPU 1011 determines whether an image is selected by the user from the image list display portion 4008. If the CPU 1011 determines that an image is selected (YES in step S5001), the processing proceeds to step S5002. In step S5002, the CPU 1011 acquires, from the list illustrated FIG. 2, an image ID (a selected-image ID) of the image selected by the user.

In step S5003, the CPU 1011 determines whether the selected image is already arranged in the album. Specifically, the CPU 1011 determines whether the image ID acquired in step S5002 is included in the list illustrated in FIG. 3, and in a case where the image ID is included in the list, the CPU 1011 determines that the selected image is already arranged in the album.

In a case where the CPU 1011 determines that the selected image is already arranged in the album (YES in step S5003), the processing proceeds to step S5004. In step S5004, the CPU 1011 generates a page thumbnail (a page image). The processing in step S5004 will be described in detail below with reference to FIG. 6. In step S5005, the CPU 1011 displays the page thumbnail generated in step S5004 in the page thumbnail display portion 4015 in FIG. 4.

In a case where the page thumbnail is displayed in step S5005, in a case where the CPU 1011 determines that an image is not selected (NO in step S5001), or in a case where the CPU 1011 determines that the selected image is not yet arranged in the album (No in step S5003), the processing proceeds to step S5006. In step S5006, the CPU 1011 determines whether the page thumbnail is selected in the page thumbnail display portion 4015. In a case where the CPU 1011 determines that the page thumbnail is selected (YES in step S5006), the processing proceeds to step S5007. In step S5007, the CPU 1011 displays a spread page corresponding to the selected page thumbnail as the spread page 4002, in the editing screen 4000 in FIG. 4. The processing in step S5007 will be described in detail below with reference to FIG. 7.

In a case where the processing in step S5007 is executed, or in a case where the CPU 1011 determines that the page thumbnail is not selected (NO in step S5006), the processing proceeds to step S5008. In step S5008, the CPU 1011 determines whether to terminate the display of the editing screen 4000 displayed as the preview display. For example, in a case where a window of the album creation application is closed, the CPU 1011 determines to terminate the display of the editing screen 4000. Alternatively, in a case where a "return button" (not illustrated) or an "order button" (not illustrated) included in the editing screen 4000 receives an instruction from the user, the CPU 1011 determines to terminate the display of the editing screen 4000. In a case where the "order button" receives an instruction from the user, the display changes from the editing screen 4000 to a screen for ordering a printed album.

In a case where the CPU 1011 determines to terminate the display of the editing screen 4000 (YES in step S5008), the CPU 1011 terminates the display of the editing screen 4000, and the processing illustrated in FIG. 5 ends. In a case where the CPU 1011 determines not to terminate the display of the editing screen 4000 (NO in step S5008), the processing returns to step S5001.

Figure 6:
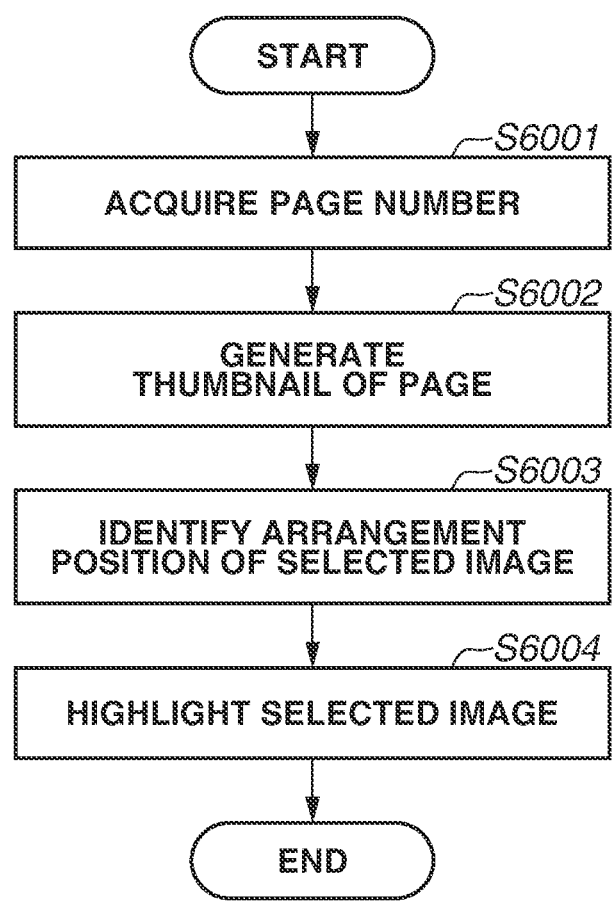
FIG. 6 is a flowchart illustrating processing of generating a page thumbnail.

The processing in step S5004 will be described with reference to FIG. 6. FIG. 6 is a flowchart illustrating the processing of generating the page thumbnail.

In step S6001, the CPU 1011 acquires a page number of the spread page in which the selected image is arranged. Specifically, the CPU 1011 acquires a page number associated with the image ID acquired in step S5002 in FIG. 5 in the list in FIG. 3. In step S6002, the CPU 1011 generates a thumbnail of the spread page of the page number acquired in step S6001. For example, in a case where an image is already present as a layout result in, for example, the RAM 1010 for the spread page of the page number acquired in step S6001, the CPU 1011 acquires this image and thereby generates the thumbnail in step S6002. On the other hand, in a case where no image is present as a layout result, the CPU 1011 creates a spread page based on the list illustrated in each of FIG. 2 and FIG. 3, and generates a thumbnail by reducing the image of the created spread page. Specifically, the CPU 1011 acquires an image ID of an image to be arranged in a target page based on the list illustrated in FIG. 3, and reads out an image file corresponding to the acquired image ID based on the file path in the list illustrated in FIG. 2. The position at which the image in the read-out image file is to be arranged and the size of this image are identified based on the list illustrated in FIG. 3, so that the spread page is created.

If the thumbnail of the target page is already stored in the RAM 1010, the thumbnail can be read out in step S6002. As described above, whether the layout result of the spread page is present or whether the thumbnail is present varies depending on various conditions. For example, in a case where a layout result or thumbnail is created in the information processing apparatus 1004 once and the created layout result or thumbnail is cached in the RAM 1010, such cached data is used in the manner described above.

In step S6003, the CPU 1011 identifies an arrangement position of the selected image in the spread page. Specifically, the CPU 1011 identifies a portion (area) where the selected image is arranged in the spread page. To be more specific, the CPU 1011 acquires the x coordinate, the y coordinate, the width, and the height corresponding to the image ID of the selected image by referring to the list illustrated in FIG. 3. Based on these pieces of information, the CPU 1011 identifies the area where the selected image is arranged in the spread page.

In step S6004, the CPU 1011 performs processing for highlighting the area (portion) corresponding to the selected image in the page thumbnail. In step S6004, the CPU 1011 scales the x coordinate, the y coordinate, the width, and the height acquired in step S6003, based on the ratio between the size of the thumbnail generated in step S6002 in FIG. 6 and the size of a spread page used as a reference in FIG. 3. Based on this scaling, the CPU 1011 identifies the area (portion) corresponding to the selected image in the thumbnail generated in step S6002 and smaller than the spread page. Subsequently, the CPU 1011 highlights the identified area. Various types of highlighting method can be used as a method for the highlighting in step S6004. For example, the CPU 1011 renders a red frame to be overlaid on a portion corresponding to the selected image, in the thumbnail generated in step S6002.

In a case where, in the list in FIG. 3, a plurality of page numbers corresponding to the image ID of the selected image is present, i.e., in a case where the selected image is arranged in a plurality of spread pages, the processing illustrated in FIG. 6 is executed for each of the plurality of spread pages. Therefore, generation of the thumbnail and the highlighting of the area corresponding to the selected image in the thumbnail are performed for each of the plurality of spread pages in which the selected image is arranged. Hence, in step S5005, in a case where the selected image is arranged in the plurality of spread pages, the plurality of page thumbnails is displayed as illustrated in FIG. 4.

In a case where the selected image selected by the user is arranged in one or a plurality of spread pages, the one or plurality of spread pages is identified by the above-described processing in FIG. 6. The generation of the page thumbnail and the above-described highlighting processing are executed for the identified one or plurality of spread pages.

Now, the processing in step S5007 will be described in detail. This processing will be described with reference to FIG. 7. FIG. 7 is a flowchart illustrating the processing of displaying a page corresponding to the page thumbnail.

In step S7001, the CPU 1011 identifies a spread page corresponding to the page thumbnail selected by the user. In step S5005 in FIG. 5, the CPU 1011 displays this page thumbnail in such a manner that the display position of the page thumbnail and the page number of the spread page corresponding to this page thumbnail are associated with each other. Therefore, in a case where the CPU 1011 determines that the page thumbnail is selected in step S5006 in FIG. 5, the CPU 1011 can identify the page number corresponding to the page thumbnail in step S7001.

In step S7002, the CPU 1011 displays, as the spread page 4002 in FIG. 4, the spread page corresponding to the page number identified in step S7001. For example, in a case where an image of the spread page of the page number identified in step S7001 is already present in the RAM 1010, the CPU 1011 displays this image in step S7002. In a case where such an image is not present, the CPU 1011 acquires an image ID of an image to be laid out in the target page, based on the list illustrated in FIG. 3, in step S7002. The CPU 1011 reads out an image file corresponding to the acquired image ID based on the file path in the list illustrated in FIG. 2. The CPU 1011 identifies the position for arranging the image included in the read-out image file and the size of this image based on the list illustrated in FIG. 3, and arranges the image in the template corresponding to the spread page.

In a case where the page displayed as the spread page 4002 in the editing screen 4000 is different from the page displayed in step S7002, the spread page 4002 is changed by the processing in step S7002.

As described above, according to the processing in the present exemplary embodiment, in a case where an image available for the album is selected by the user, and the selected image is arranged in an album, the thumbnail of the spread page in which the selected image is arranged is displayed. For example, in a case where the selected image is displayed in each of the plurality of spread pages, the plurality of page thumbnails is displayed. Further, an area (a portion) corresponding to the selected image is highlighted in each of the page thumbnails. Therefore, the user can easily recognize the one or plurality of spread pages in which the selected image is arranged. Further, the user can easily recognize the area (portion) where the selected image is arranged in each of the spread pages.

Furthermore, the user selects the page thumbnail, so that the spread page corresponding to the selected page thumbnail is displayed as the spread page 4002 in FIG. 4, and the user can perform various types of editing within the spread page. For example, the user can easily perform editing for avoiding arranging a specific image in a plurality of spread pages based on the processing in the present exemplary embodiment. Specifically, at first, the user selects a specific image as the selected image. In a case where two page thumbnails are displayed, the user selects either one of these page thumbnails, so that the selected page thumbnail is displayed as the spread page 4002. Then, the user can perform editing of replacing this selected image with another image in the spread page 4002.

In particular, in the above-described exemplary embodiment, the page thumbnail serving as a page image that represents the spread page is displayed in a size smaller than the spread page 4002 for editing. Therefore, even in a case where the selected image is used in a plurality of pages, i.e., a plurality of page images is displayed, these images can be displayed as a list. In a case where a page image is selected, the spread page corresponding to the selected page image is displayed in a large size as the spread page 4002 to enable editing. Therefore, the user can easily perform editing in the spread page displayed in the large size.

In the above-described exemplary embodiment, in a case where the selected image is selected by the user, only the page thumbnail of the spread page in which the selected image is arranged is displayed in the page thumbnail display portion 4015. However, the exemplary embodiment is not limited to this example. For example, the page thumbnails of all the pages can be displayed in the page thumbnail display portion 4015, and among the displayed page thumbnails, the page thumbnail of the spread page in which the selected image is arranged can be highlighted. Further, an area corresponding to the selected image can be highlighted within the highlighted page thumbnail.

In a case where a selected image is selected by the user in the image list display portion 4008 in the editing screen 4000 illustrated in FIG. 4, highlighting is performed in the page thumbnail as described above. In this process, highlighting such as overlaying a red frame on the selected image can be performed in the image list display portion 4008 as well. Further, in a case where the selected image is included in the spread page 4002, highlighting such as overlaying a red frame on the selected image can be performed within the spread page 4002 as well.

Suppose, in a state where a page thumbnail for a certain selected image is displayed in the page thumbnail display portion 4015, another selected image is selected in the image list display portion 4008. In this case, the page thumbnail displayed earlier disappears from the page thumbnail display portion 4015, and the page thumbnail of the newly selected image is displayed in the page thumbnail display portion 4015. Alternatively, the page thumbnail of the newly selected image can be displayed in the page thumbnail display portion 4015, in a state where the page thumbnail displayed earlier remains in the page thumbnail display portion 4015. In this case, the page thumbnail displayed earlier moves to a position in a lower portion of the page thumbnail display portion 4015 to be displayed at that position.

Not only the page thumbnails but various kinds of information can be displayed in the page thumbnail display portion 4015 in FIG. 4. For example, in a case where the image 4004 or 4005 is selected by the user in the spread page 4002, a menu for performing various types of editing (such as image replacement and color conversion) on the selected image can be displayed in the page thumbnail display portion 4015. The user drags an image from the image list display portion 4008 to the spread page 4002, so that the dragged image is added to the spread page 4002. In this case, the above-described menu for performing editing on the added image can be displayed in the page thumbnail display portion 4015.

The page thumbnails of all the pages of the album can be displayed in the page thumbnail display portion 4015, in a case where the user designates a portion different from the spread page 4002, the previous button 4006, and the next button 4007 in the album display portion 4001 by performing an operation such as a mouse click. In this case, the above-described highlighting of a portion of the selected image is not performed, but the spread page corresponding to the page thumbnail selected by the user is displayed.

The above-described display of the menu or the page thumbnails of all the pages in the page thumbnail display portion 4015 is performed during the execution of the processing in FIG. 5. For example, suppose, in a state where the editing screen 4000 illustrated in FIG. 4 is displayed, the display of the menu is performed or the page thumbnails of all the pages are performed. In this case, the page thumbnails 4016 and 4017 can disappear from the page thumbnail display portion 4015, or can remain in the page thumbnail display portion 4015.

In the described-described exemplary embodiment, the album creation application is described as an example of an application, but the application is not limited to this example. For example, any application having a similar image layout function can implement the processing in the present exemplary embodiment.

In the described-described exemplary embodiment, the PC or smartphone is used as an example of the information processing apparatus. However, the information processing apparatus is not limited to this example. For example, a mobile phone, a portable information terminal, a digital still camera, a digital video camera, a mobile music player, a game, a set-top box, and an Internet appliance can each operate as the above-described information processing apparatus.

As a configuration of the network for connecting the information processing apparatus of the described-described exemplary embodiment to other devices, it is possible to adopt any other network configuration such as Ethernet, a wireless local area network (LAN), Institute of Electrical and Electronics Engineering (IEEE) 1394, or Bluetooth®.

In the described-described exemplary embodiment, the thumbnail of the spread page is described as an example of the page image to be partially highlighted, but the page image is not limited to this example. For example, an image of a size equal to the size of the spread page or an image of a size larger than the size of the spread page can be displayed as the page image, in place of the above-described page thumbnail. In this case, in step S6004 in FIG. 6, the acquired x coordinate, y coordinate, width, and height are scaled based on the ratio between the size of the page image and the size of the spread page used as the reference in FIG. 3.

In the described-described exemplary embodiment, overlaying the red frame on the page thumbnail is described as an example of the method of highlighting the area of the selected image in the page thumbnail. However, the method of highlighting is not limited to this example, and the area can be highlighted using a frame of an arbitrary color. Further, overlaying the frame is described as example of the method of highlighting, but the method of highlighting is not limited to this example. For example, it is possible to use any other highlighting method, such as overlaying a translucent rectangle on an area of the selected image, or making an area excluding the selected image translucent.

In the above-described exemplary embodiment, the user selects an image in the image list display portion 4008, but the selection is not limited to this example. The user can select an image in the spread page 4002. A plurality of page thumbnails can be displayed by this selection.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-146641, filed Aug. 8, 2019, which is hereby incorporated by reference herein in its entirety.

What is claimed is:

1. An information processing apparatus comprising:
   at least one processor to cause the information processing apparatus to perform operations including:
   arranging a first image in a first page, causing a display to display a first area including a first page image in which the first image is arranged in the first page, and a second area including a plurality of images, and accepting a select instruction for selecting a second image among the plurality of images in the second area, wherein, in a case where the select instruction for selecting the second image in the second area is accepted and in a case where the second image has been already arranged in a second page different from the first page, a thumbnail of a second page image in which the second image is arranged in the second page is displayed together with the first area and the second area in response to the select instruction, and wherein, in a case where the thumbnail of the second page image is selected, the second page image is displayed on the first area to enable editing of the second image arranged in the second page.

2. The information processing apparatus according to claim 1, wherein a size of the thumbnail of the second page image is smaller than a size of the second page image displayed on the first area.

3. The information processing apparatus according to claim 1, wherein a corresponding area, corresponding to the second image in the thumbnail of the second page image, is highlighted in such a way as to distinguish the corresponding area from an area corresponding to other images arranged in the thumbnail of the second page image.

4. The information processing apparatus according to claim 1, wherein, in the case where the select instruction for selecting the second image in the second area is accepted and in a case where the second image has not been arranged in any pages, a thumbnail is not displayed.

5. The information processing apparatus according to claim 1, wherein at least one image is arranged in each of a plurality of pages included in an album.

6. The information processing apparatus according to claim 5, wherein the plurality of pages respectively correspond to a plurality of spread pages included in the album.

7. A method for an information processing apparatus, the method comprising:

arranging a first image in a first page;

causing a display to display a first area including a first page image in which the first image is arranged in the first page, and a second area including a plurality of images; and accepting a select instruction for selecting a second image among the plurality of images in the second area, wherein, in a case where the select instruction for selecting the second image in the second area is accepted and in a case where the second image has been already arranged in a second page different from the first page, a thumbnail of a second page image in which the second image is arranged in the second page is displayed together with the first area and the second area in response to the select instruction, and wherein, in a case where the thumbnail of the second page image is selected, the second page image is displayed on the first area to enable editing of the second image arranged in the second page.

8. The method according to claim 7, wherein a size of the thumbnail of the second page image is smaller than a size of the second page image displayed on the first area.

9. The method according to claim 7, wherein a corresponding area, corresponding to the second image in the thumbnail of the second page image, is highlighted in such a way as to distinguish the corresponding area from an area corresponding to other images arranged in the thumbnail of the second page image.

10. The method according to claim 7, wherein, in the case where the select instruction for selecting the second image in the second area is accepted and in a case where the second image has not been arranged in any pages, a thumbnail is not displayed.

11. The method according to claim 7, wherein at least one image is arranged in each of a plurality of pages included in an album.

12. The method according to claim 11, wherein the plurality of pages respectively correspond to a plurality of spread pages included in the album.

13. A non-transitory computer-readable storage medium storing a program to cause a computer to perform a method for an information processing apparatus, the method comprising:

arranging a first image in a first page;

causing a display to display a first area including a first page image in which the first image is arranged in the first page, and a second area including a plurality of images; and accepting a select instruction for selecting a second image among the plurality of images in the second area, wherein, in a case where the select instruction for selecting the second image in the second area is accepted and in a case where the second image has been already arranged in a second page different from the first page, a thumbnail of a second page image in which the second image is arranged in the second page is displayed together with the first area and the second area in response to the select instruction, and wherein, in a case where the thumbnail of the second page image is selected, the second page image is displayed on the first area to enable editing of the second image arranged in the second page.

* * * * *